US012564741B1

(12) United States Patent
Barrick et al.

(10) Patent No.: US 12,564,741 B1
(45) Date of Patent: Mar. 3, 2026

(54) RESPIRATOR TEST SYSTEM

(71) Applicant: National Technology & Engineering Solutions of Sandia, LLC, Albuquerque, NM (US)

(72) Inventors: Todd Andrew Barrick, Bosque Farms, NM (US); Eric A. Shaner, Rio Rancho, NM (US); Bradley Salzbrenner, Albuquerque, NM (US); Michael Alexis Omana, Edgewood, NM (US); Thomas John Rogers, Albuquerque, NM (US); Dora K. Wiemann, Albuquerque, NM (US); Lorenzo Jiron, Sandia Park, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 18/895,542

(22) Filed: Sep. 25, 2024

Related U.S. Application Data

(62) Division of application No. 17/955,383, filed on Sep. 28, 2022, now Pat. No. 12,161,894.

(60) Provisional application No. 63/310,806, filed on Feb. 16, 2022, provisional application No. 63/256,444, filed on Oct. 15, 2021.

(51) Int. Cl.
*A62B 27/00* (2006.01)
*G01N 15/08* (2006.01)

(52) U.S. Cl.
CPC ......... *A62B 27/00* (2013.01); *G01N 15/0806* (2013.01); *G01N 2015/084* (2013.01)

(58) Field of Classification Search
CPC .......... G01N 15/0806; G01N 2015/084; A62B 27/00
See application file for complete search history.

(56) References Cited

U.S. PATENT DOCUMENTS 12,161,894 B1 * 12/2024 Barrick .............. G01N 15/0806

FOREIGN PATENT DOCUMENTS

| | | | | |
|---|---|---|---|---|
| CN | 107860498 A | * | 3/2018 | ........... G01L 5/0028 |
| CN | 112304850 A | * | 2/2021 | .............. G01N 7/10 |
| CN | 213633106 U | * | 7/2021 | |
| CN | 11340787 A | | 9/2021 | |
| CN | 113340787 A | * | 9/2021 | ......... G01N 15/0806 |
| EP | 2123330 A1 | * | 11/2009 | ............. A62B 27/00 |
| WO | WO-2014152268 A1 | * | 9/2014 | ............. A62B 27/00 |

* cited by examiner

*Primary Examiner* — Jamel E Williams
(74) *Attorney, Agent, or Firm* — Mark A. Dodd

(57) ABSTRACT

A test fixture facilitates non-destructive testing of a protective mask. The test fixture includes a mock facial structure, a clamping form that makes a seal around at least part of the facial structure, and can employ the retaining straps of the protective mask to a make a seal around at least part of the facial structure. In use, the protective mask is tested in situ on the facial structure. In some examples, the clamping form has a negative contour of the mock facial structure or of the outer surface of a protective mask that is to be tested. The testing can include repetitive testing of the fit, structural components (e.g., ultrasonic welds and straps), and the degradation of materials as a function of donning/doffing or environmental factors (e.g., temperature and humidity).

9 Claims, 11 Drawing Sheets

1510   Side View              Top View

1600

1670          1610

1640

1630

1650

1660

1620

1700

1800

1800

1800

RESPIRATOR TEST SYSTEM

RELATED APPLICATIONS

This application is a divisional of U.S. patent application Ser. No. 17/955,383, filed on Sep. 28, 2022, and entitled RESPIRATOR TEST SYSTEM, which claims priority to U.S. Provisional Application No. 63/256,444, filed on Oct. 15, 2021, and entitled TEST FIXTURE FOR BREATHING MASKS, the entirety of which is incorporated herein by reference. This application further claims priority to U.S. Provisional Application No. 63/310,806, filed on Feb. 16, 2022, and entitled RESPIRATOR TEST SYSTEM, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The invention relates to methods and apparatus for the filtration and functionality testing of protective masks and respirators.

BACKGROUND

Protective masks are essential in many fields for protecting workers from hazardous airborne particles. The ability to remove particulates from respirated air is provided by a filter medium. In some protective masks, the filter medium is a replaceable component housed in a cartridge or the like. In other protective masks, particularly some that are disposable and meant for single use, the filter medium is integral with the body of the protective mask.

For a filter medium to be acceptable for a particular application, its performance must be verified through testing. Performance measures such as particle penetration and fit testing are well known, and several manufacturers offer commercially available instruments for both applications.

In a typical testing configuration, an airflow path passes vertically through a test stage. On the test stage, the filter medium is clamped between upper and lower clamping plates, each of which is apertured for air passage. If the filter medium is in the form of a sheet, it can generally be clamped directly between the two plates.

For a more complicated geometry, such as a reusable protective mask or a disposable protective mask tested in its manufactured geometry, a special fixture is used. For example, a protective mask under test may be placed within a chamber that is sealed between the upper and lower plates but open to the airflow path. In example scenarios, the airflow direction is top to bottom, and the protective mask is placed face-upward on the floor of the chamber. That is, the protective mask surface that faces away from the wearer when in use is directed upward. Typically, a putty-like substance is used to seal the edges of the protective mask to the floor of the chamber, so that air can exit the chamber only by passing through the protective mask.

Although current approaches have been useful for testing protective masks, they also have certain limitations. For example, application of the sealant to the edges of the protective mask is time-consuming, especially if the sealant needs to cure before testing can begin. The sealant is also prone to contaminate the protective mask and render it ineligible for retesting. Further, although the sealing of the protective mask to the chamber floor is convenient, it does not realistically represent the physical conditions of protective mask use in real life, and it is therefore only partially predictive of real-life protective mask performance.

Additionally, current tests do not address other potential protective mask limitations. These limitations may include performance and durability of the straps used to secure a protective mask to a user's face, and any welds, stitches, seams, and/or folds used to form the protective mask itself.

For these reasons, there is a need for test fixtures that offer greater versatility and convenience than those currently available.

SUMMARY

In various embodiments of the present invention, a test fixture facilitates non-destructive testing of a respirator or other type of protective mask for filtering and flow characteristics when used, e.g., in conjunction with a commercial filter tester. The test fixture includes a mock facial structure and a clamping form that forms a seal around at least part of the mock facial structure.

In a first primary embodiment, a test fixture for testing filtering characteristics of a protective mask comprises an anatomical form (the anatomical form emulating contours of at least those portions of a human face that contact a protective mask when a protective mask is in use), and a counter form (the counter form including a surface thereof that is a negative of a protective mask or portions of the anatomical form to which the counter form mates), wherein the anatomical form and the counter form are reversibly mateable and clampable in a mated position, and within each of the anatomical form and the counter form, respective air passages are defined for airflow through respective forms and, when in use, through a protective mask mounted between the anatomical form and the counter form.

In various embodiments of the first primary embodiment, a surface of the counter form includes a gasket comprising a compliant material; the anatomical form or the counter form includes a plurality of alignment pins and the other one of the anatomical form or the counter form includes a plurality of alignment holes (each of the plurality of alignment holes aligning with a corresponding one of the plurality of alignment pins); the test fixture further comprises means for compressing (the means compressing the anatomical form against the counter form, the means including a spring clip, a clamp, a screw, and/or a bolt); the test fixture further comprises a pair of means for sealing (the means sealing the air passages within the anatomical form and the counter form, each means including a shutter or a valve); and the test fixture further comprises at least one of an inlet or an outlet (each inlet or outlet controlling an environment within the test fixture).

In various other embodiments of the first primary embodiment, the air passage in the anatomical form includes both a simulated nasal cavity and a simulated oral cavity (thereby permitting testing of a flow of air through a protective mask, the simulated nasal cavity, and the simulated oral cavity), the air passage in the anatomical form includes a simulated nasal cavity (thereby permitting testing of a flow of air through a protective mask and the simulated nasal cavity), or the air passage in the anatomical form includes a simulated oral cavity (thereby permitting testing of a flow of air through a protective mask and the simulated oral cavity);

and the anatomical form and/or the counter form includes a heater (the heater heating the protective mask).

In a second primary embodiment, a test fixture for testing filtering characteristics of a protective mask comprises an anatomical form (the anatomical form emulating contours of at least those portions of a human face that contact a protective mask when a protective mask is in use) and wherein within the anatomical form, an air passage is defined for airflow through the anatomical form and, when in use, through a protective mask mounted in contact with the anatomical form.

In various embodiments of the second primary embodiment, a surface of the anatomical form comprises a compliant material; the test fixture further comprises means for sealing (the means sealing the air passage within the anatomical form, the means including a shutter or a valve); the test fixture further comprises an inlet and/or an outlet (the inlet and/or outlet controlling an environment within the test fixture); the air passage in the anatomical form includes both a simulated nasal cavity and a simulated oral cavity (thereby permitting testing of a flow of air through a protective mask, the simulated nasal cavity, and the simulated oral cavity), the air passage in the anatomical form includes a simulated nasal cavity (thereby permitting testing of a flow of air through a protective mask and the simulated nasal cavity), or the air passage in the anatomical form includes a simulated oral cavity (thereby permitting testing of a flow of air through a protective mask and the simulated oral cavity); and the anatomical form includes a heater (the heater heating the protective mask).

In a third primary embodiment, a test fixture for testing physical characteristics of a protective mask, the protective mask including one or more straps, the test fixture comprises a separable structure (the separable structure separating into at least two portions, at least one of the portions being an anatomical form emulating contours of at least those portions of a human face that contact the protective mask when a protective mask is in use), and at least one tensioner (each tensioner separating the separable structure into at least two portions thereby enabling parallel and/or perpendicular testing of a joint between one or more straps and the protective mask).

In various embodiments of the third primary embodiment, a surface of the anatomical form comprises a compliant material; each tensioner includes an electro-mechanical or a hydro-mechanical element; the air passage in the anatomical form includes both a simulated nasal cavity and a simulated oral cavity (thereby permitting testing of a flow of air through a protective mask, the simulated nasal cavity, and the simulated oral cavity), the air passage in the anatomical form includes a simulated nasal cavity (thereby permitting testing of a flow of air through a protective mask and the simulated nasal cavity), or the air passage in the anatomical form includes a simulated oral cavity (thereby permitting testing of a flow of air through a protective mask and the simulated oral cavity); and the test fixture further comprises a scalable box, the separable structure and/or the scalable box includes a heater (the heater heating the protective mask) or the scalable box includes a humidifier (the humidifier introducing humidity into the sealable box).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 5 is a rendering showing an example test fixture according to an embodiment of the present invention in exploded perspective view.

FIG. 6 is a rendering, in perspective view, of the subassemblies of a test fixture according to an embodiment of the present invention. The subassemblies are shown separated, but in the orientation they would occupy when in use.

FIGS. 10-12 are, respectively, a perspective view, a plan view, and a side view. An overlay shows how a portion of the upper subassembly forms a seal to the lower subassembly.

DETAILED DESCRIPTION

Figure 15:
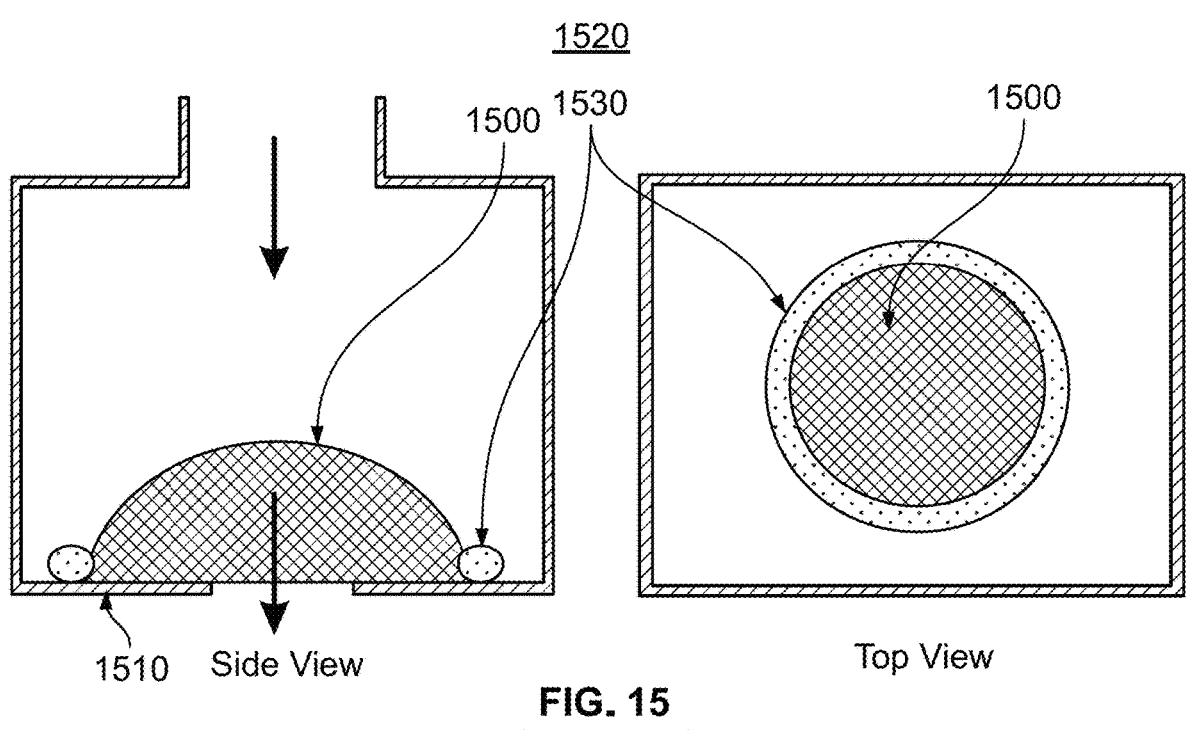
FIG. 15 is a notional view of a portion of a prior art test fixture system.

As noted above, a conventional method of protective mask testing requires the protective mask to be sealed to the floor of a test fixture using a putty or similar sealant, which may contaminate the protective mask, as illustrated in FIG. 15, and described below. By contrast, a protective mask can be tested nondestructively by mounting it on an anatomical form that simulates at least that portion of a human face that contacts the protective mask under conditions of actual use.

Figures 1, 2:
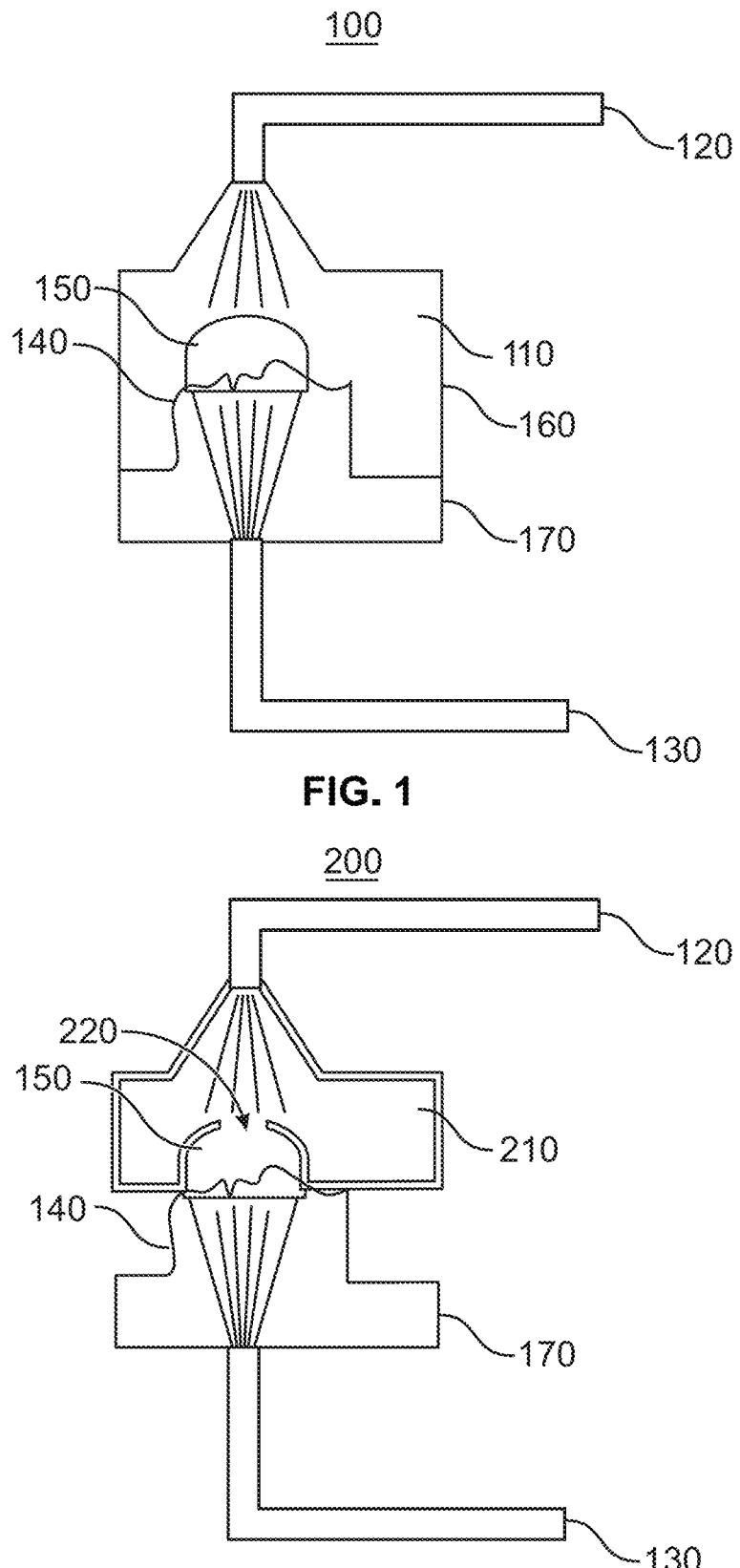
FIG. 1 is a notional view, in cross section, illustrating the airflow path according to an embodiment of the present invention.
FIG. 2 is a notional view, in cross section, illustrating the airflow path according to an embodiment of the present invention.

FIG. 1 illustrates a new approach in a broad aspect. It should be understood that FIG. 1 is a notional diagram that is presented solely for pedagogical purposes, and not as a realistic representation. As shown in FIG. 1, a test fixture 100 having a flow chamber 110 has an inlet 120 and an outlet 130 for airflow. The lower portion of the test fixture 100 includes an anatomical form 140. The anatomical form 140 should include a simulacrum of at least those portions of a human face that contact a protective mask 150 when it is in use. However, a greater portion of human anatomy, even the entire front portion or more of a human head, may usefully be simulated for some purposes. It should also be understood that even though examples of the anatomical form 140 are referred to as a mock human facial structure, those portions that do not directly contact the protective mask do not need to be realistic representations. In fact, unnaturally large apertures may be included to allow for the passage of air.

Turning back to FIG. 1, it will be seen that the flow chamber 110 includes a cover 160 that seals against a base plate 170 in the lower portion of the test fixture 100. The protective mask 150 is shown mounted on the anatomical form 140. Instead of using a sealant to seal the protective mask 150 to the anatomical form 140, the protective mask 150 is pressed against a compliant material that forms a seal to the protective mask 150 in similar manner to human skin. The compliant material constitutes at least an outer surface portion of the anatomical form 140, at least in those areas that contact the protective mask 150.

The sealing pressure may be applied by straps (not illustrated) or by any other suitable means. In more limited embodiments of the invention, as described below, the flow chamber 110 contacts the protective mask 150 and directly transmits the sealing pressure. Such an embodiment is illustrated in FIG. 2.

FIG. 2, like FIG. 1, is a notional diagram that is presented solely for pedagogical purposes, and not as a realistic representation. The test fixture 200 shown in FIG. 2 is similar to that of FIG. 1, except that the protective mask 150 is now clamped between the flow chamber 210 and the anatomical form 140. The protective mask-facing surface of the flow chamber 210 is contoured to provide a seal to the protective mask 150. An aperture 220 in the protective mask-facing surface of the flow chamber 210 admits airflow to the protective mask 150 from an air cavity within the flow chamber 210.

Figure 3:
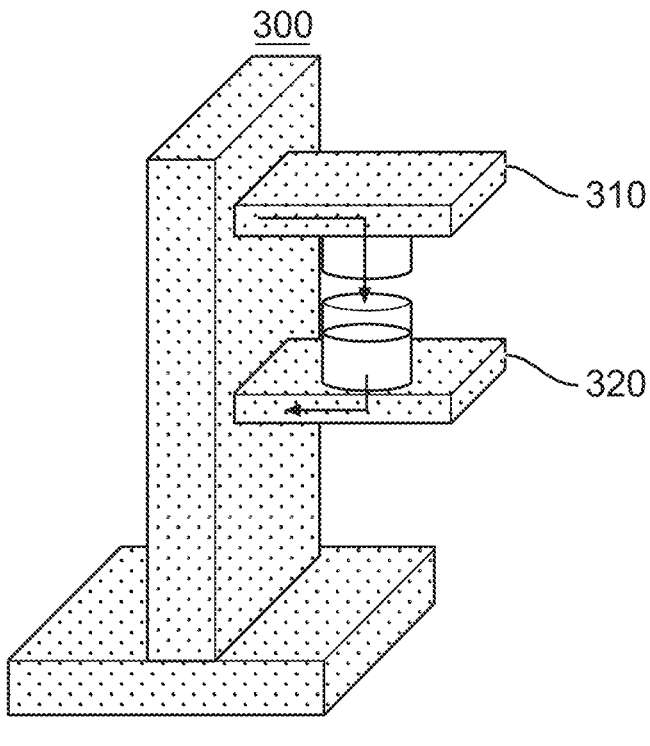
FIG. 3 is a notional perspective view showing the positioning within a conventional filter tester of a test fixture according to an embodiment of the present invention.

FIG. 3 illustrates a mode for using the test fixture 300. Like FIGS. 1 and 2, FIG. 3 is a notional diagram that is presented solely for pedagogical purposes, and not as a realistic representation. FIG. 3 shows a conventional filter tester, with an upper clamping plate 310 and a lower clamping plate 320. A portion of the airflow path is indicated by bent arrows. In the example shown, the air used for testing flows vertically downward from the upper clamping plate 310 to the lower clamping plate 320. At least one of the upper or lower clamping plates 310, 320 has a vertical range of motion, so that devices under test (DUTs), for example, protective masks, can be placed between the upper and lower clamping plates 310, 320 and immobilized with moderate compression. A typical range of motion is about one foot. A double-headed arrow in FIG. 3 indicates the vertical motion of the upper and lower clamping plates 310, 320.

To use it for making a test, a DUT (not illustrated), for example, a protective mask, is set in place between the upper and lower clamping plates 310, 320 and the upper and lower clamping plates 310, 320 are brought against the DUT to immobilize it. A test fixture 300 just prior to immobilization is shown schematically in FIG. 3.

Figure 4:
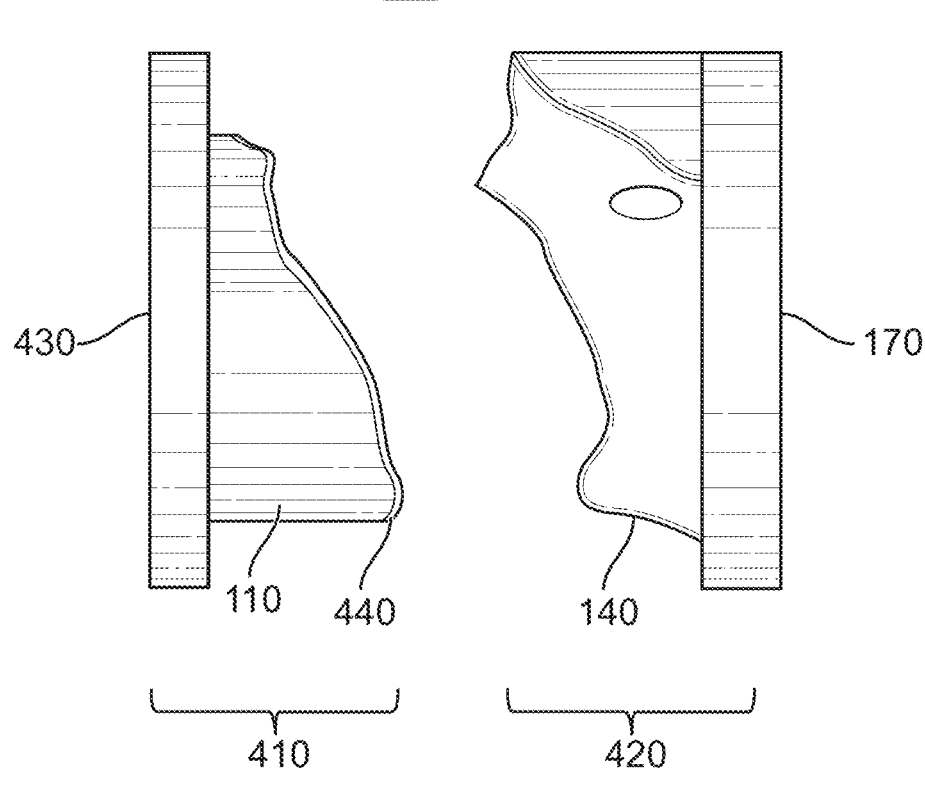
FIG. 4 is a rendering in side view, showing the subassemblies of a test fixture according to an embodiment of the present invention. The view is rotated so that the upper subassembly is on the left and the lower subassembly is on the right.

FIG. 4 is a representation, to scale, of the subassemblies of a test fixture 400 in an example embodiment. The upper subassembly 410, corresponding, at least in part, to the flow chamber 110, is on the left, and the lower subassembly 420 is on the right. As seen in FIG. 4, the lower subassembly 420 includes the (lower) base plate 170, and the anatomical form 140. The upper subassembly 410 includes an (upper) base plate 430, the flow chamber 110, and a gasket 440 thereon. Opposite the upper base plate 430, the flow chamber 110, with its gasket 440, is contoured to form a seal against the anatomical form 140 or against a protective mask (not illustrated) mounted on the anatomical form 140. For this purpose, the contour of the flow chamber 110 may be, at least approximately, a negative of the protective mask or the portions of the anatomical form 140 to which it is intended to seal. Accordingly, the contoured part of the flow chamber 110 that mates against the anatomical form 140 will be referred to as the "counter form."

The upper and lower base plates 430, 170 have flat surfaces for placement on, and sealing to, the respective upper and lower clamping plates 310, 320 of the test fixture 300. In some filter testers, one or both clamping plates 310, 320 may include an O-ring or gasket for effectuating this seal. Each base plate 430, 170 is apertured for admission of the airflow. In embodiments, there is an air cavity through the flow chamber 110 and its counter form within the upper subassembly 410. There may also be an air cavity within the anatomical form 140, from which there is outflow through the aperture in the lower base plate 170.

Figure 9:
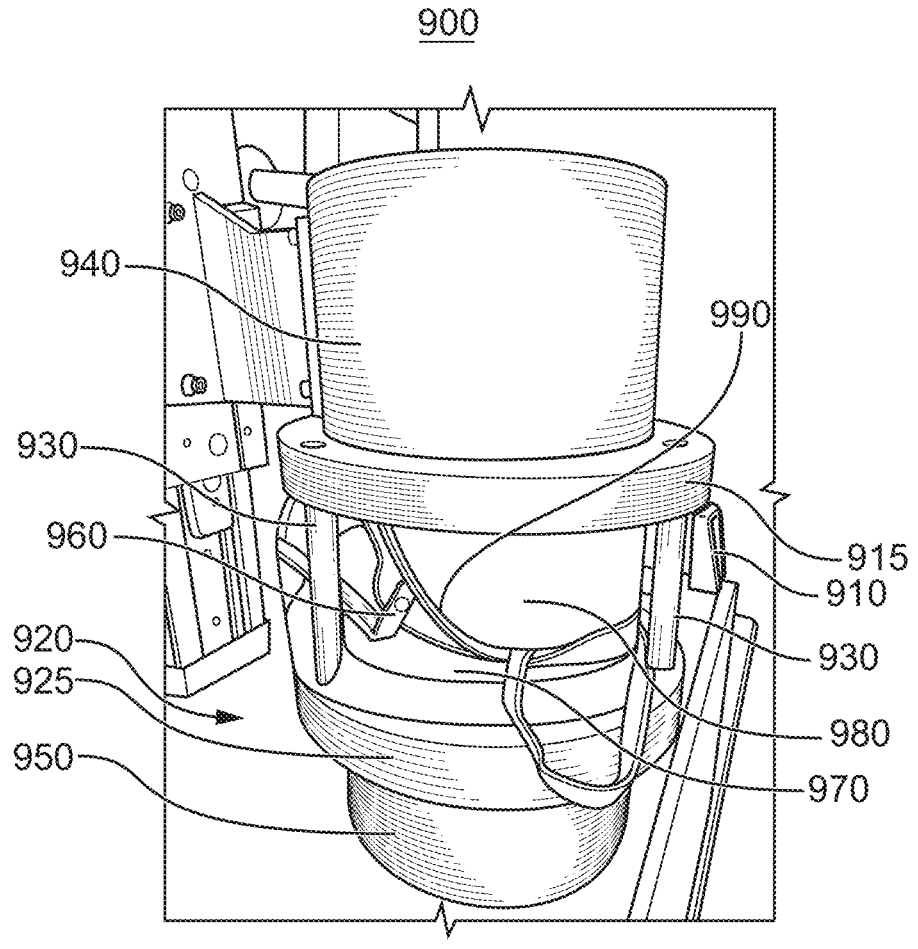
FIG. 9 is a view of an example test fixture according to an embodiment of the present invention loaded with a protective mask under test and assembled in a conventional filter tester.
Figure 14:
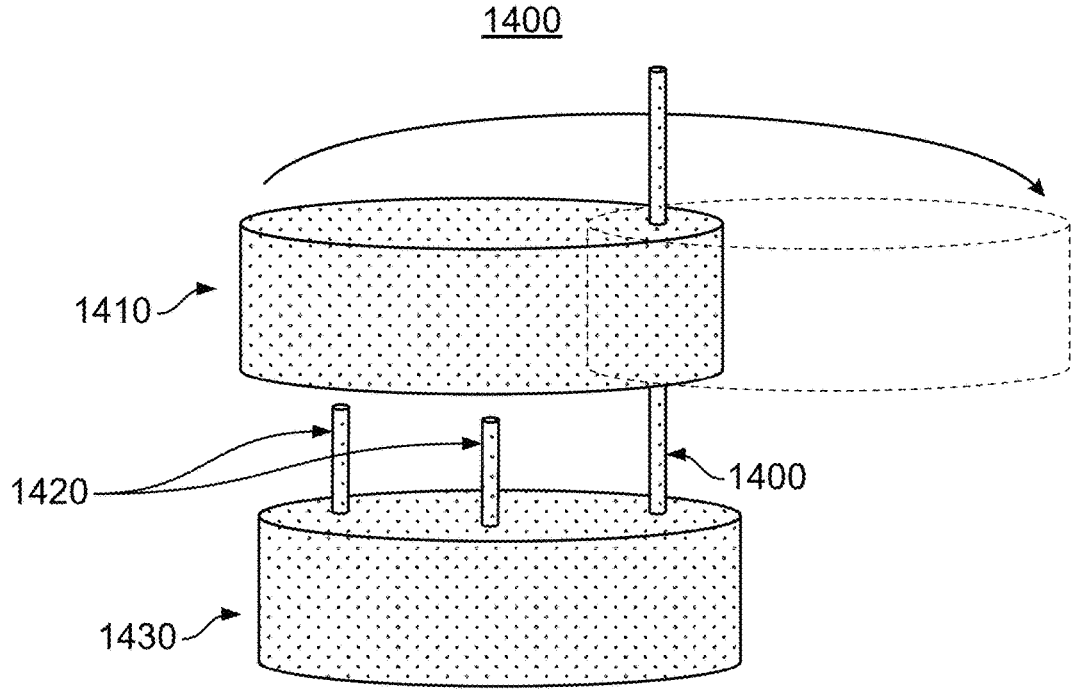
FIG. 14 is a schematic diagram, shown in side-elevational cross section, illustrating a method of opening a hermetically sealable test fixture according to an embodiment of the present invention.

A mechanism is advantageously provided for aligning the upper and lower subassemblies 410, 420 to each other. An example of such a mechanism consists of three alignment pins, each of which passes through a hole in the lower base plate 170 and a corresponding hole in the upper base plate 430. The alignment pins are preferably precision machined to assure sufficiently accurate alignment. Alignment pins are not shown in FIG. 4, but they are shown in FIGS. 9 and 14.

The example presented here is typical in that the anatomical form 140 faces upward and the airflow through the anatomical form 140 is downward. This orientation corresponds to the typical direction of airflow in filter testers, and it is also advantageous because it permits the placement of the protective mask to be aided by gravity. However, other orientations are not precluded. Accordingly, no example orientation should be considered limiting as to the scope of the invention.

As shown in FIG. 4, both the upper subassembly 410 and the lower subassembly 420 can be composites of two, or even more, materials. In the example, the base plates 430, 170 are made of a relatively rigid material, but at least the outer surface of the anatomical form 140 is made of a more compliant material. Although not shown in FIG. 4, the anatomical form 140 may have a supportive internal structure made of a more rigid material, and even outer portions that do not directly contact the protective mask may be made of the more rigid material. Similarly, the flow chamber 110 of the upper subassembly 410 is made of a relatively rigid material, but the counter form terminates in a gasket made of compliant material.

It should be understood in this regard that "rigid" and "compliant" are meant as relative terms. As such, they are not limited to any specific values or ranges, except in specific examples as discussed below. The rigid material can be any suitable material that is able to maintain its shape during ordinary use of the test fixture. The compliant material can be any suitable material that deforms under pressure enough to form a protective mask seal, and preferably to at least the same degree as human skin under comparable conditions.

Those skilled in the art will recognize that various manufacturing techniques may be suitable for the fabrication of a test fixture as described here. One such technique is 3D printing. By printing with suitable resins, a workpiece can readily be fabricated as a composite of rigid and compliant portions.

One example of suitable rigid resin for 3D printing is Vero™ photopolymer, which is commercially available from Stratasys, Ltd., a corporation with U.S. headquarters in Eden Prairie, Minnesota, and a website at www.stratasys-.com. Vero has a Shore harness of 83-86. (For comparison, human skin has a Shore hardness of about 13.)

One example of a suitable compliant resin for 3D printing is Agilus 30 photopolymer, which has a Shore hardness of 30-35 and resembles rubber in its appearance, feel, and performance. Another resin useful for 3D printing is SUP706B, a gel-like support material. Agilus 30 and SUP706B are commercially available from Stratasys, Ltd. All three of the resins listed here are suitable for use with Polyjet™ 3D printing equipment available from Stratasys, Ltd.

One useful feature of 3D printing is the ability to create infill patterns. Although a structural element can be printed as a continuous solid, it is often preferable to print it as a network of walls surrounding air-filled cells. The network of walls constitutes the infill pattern. The operator of the 3D printer typically has control over the geometry of the infill pattern and over its density. A continuous, solid fill has a density of 100%. In the context of 3D-printed anatomical forms, this control makes it possible, by adjusting the infill density, to tune the printed material to mimic human skin in properties such as Shore hardness.

Molding is another technique that may be useful for forming components of the test fixture. One moldable material that is potentially useful in this regard is ballistic gel (synthetic ballistics gelatin), because it resembles human muscle tissue in viscosity and density.

Silicone rubber is another material that is potentially useful in this regard. Silicone rubber parts can be made by various techniques, including molding and 3D printing.

Figures 5, 6:
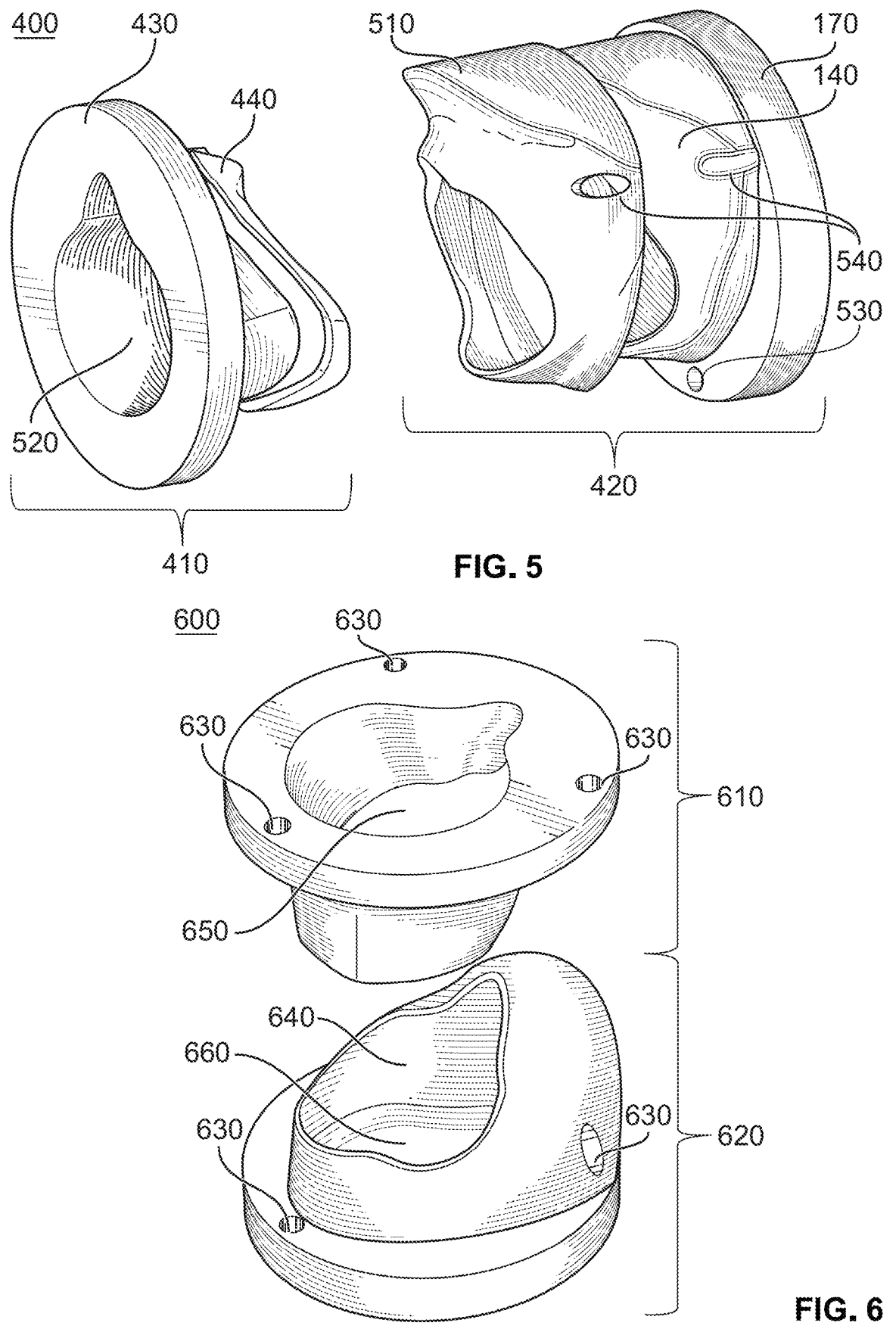

Turning to FIG. 5, the upper and lower subassemblies 410, 420 of the example test fixture 400 are shown in perspective view. The view is exploded, so that the gasket 440 is shown separated from the counter form on the upper subassembly 410, and a compliant outer liner 510 is shown separated from a supportive inner structure for the lower subassembly 420 that includes the anatomical form 140. The gasket 440 and outer liner 510 are made of a compliant material. A possible example is Agilus 30 resin, at a final thickness of 0.15 inches. The other portions are made of a rigid material, such as Vero. A manufacturing facility equipped with a 3D printer capable of combining different materials in a single layer would be able to form the upper subassembly 410 in a single printing operation, and likewise the lower subassembly 420. Otherwise, overmolding or bonding techniques could be used to form the upper and lower subassemblies 410, 420.

In the view of FIG. 5, an aperture 520, corresponding to the flow chamber 110, in the upper base plate 430 is clearly visible. Similarly, an alignment hole 530 is visible near the bottom of the lower baseplate 170, and another alignment hole 540 is seen passing through the outer liner 510 and part of the inner structure of the anatomical form 140.

In typical examples, the gasket 440 will have a uniform thickness, and the contour that underlies it on the upper subassembly will match the corresponding facial contour or protective mask contour on the lower subassembly 420. This is desirable because it will help to maintain a seal over the entire contact surface when compressed between the upper and lower clamping plates 310, 320. Another benefit of a uniformly thick gasket 440 is that by following the contours of the lower subassembly 420, the risk of damaging the protective mask material by twisting or bunching it can be reduced.

While not illustrated in FIG. 5, the base plates 430, 170 of the example test fixture 400 may optionally include corresponding recesses (not illustrated). These recesses would be formed to hold gaskets, for example, o-rings, to facilitate air-tight mating with the corresponding upper and lower clamping plates 310, 320 of the test fixture 300 illustrated in FIG. 3.

Figure 7:
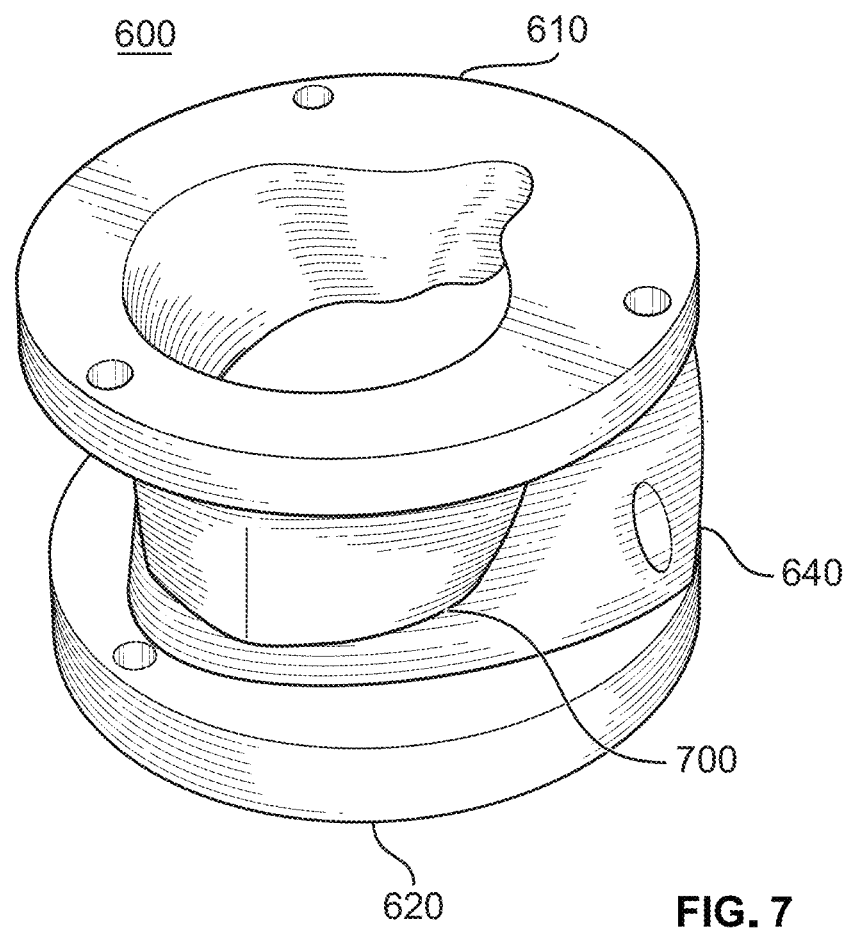
FIG. 7 is a rendering of the test fixture of FIG. 6 with the subassemblies in the same orientation, but in an engaged condition.
Figure 8:
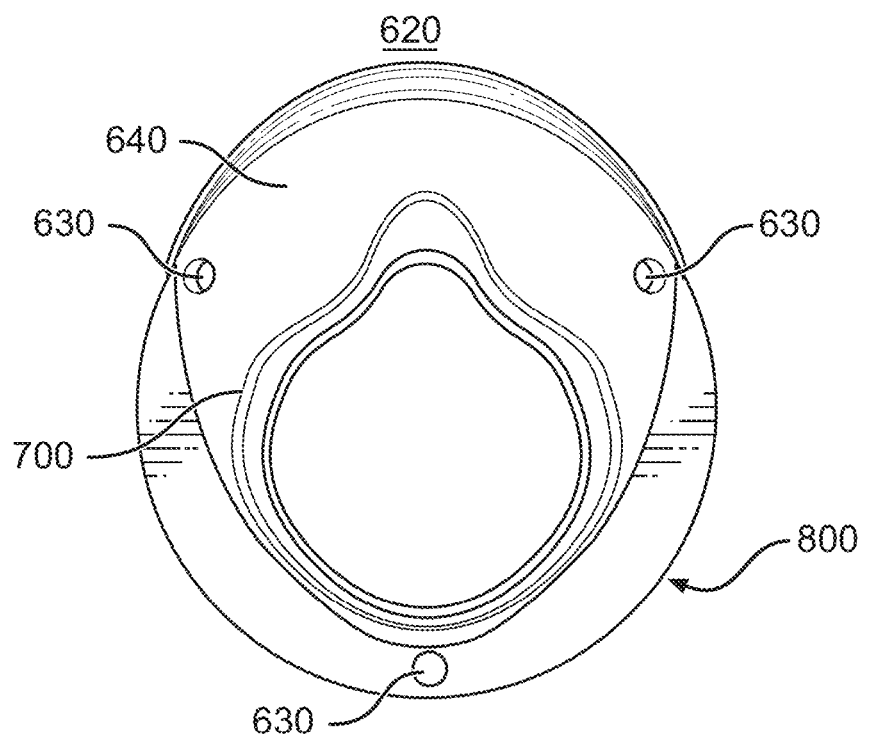
FIG. 8 is a rendering in plan view of the lower subassembly of the test fixture of FIGS. 6 and 7.

Another example test fixture 600 is shown in FIGS. 6-8. FIG. 6 provides a clear view of the upper and lower subassemblies 610, 620, with all three alignment holes 630 visible in the upper subassembly 610, one alignment hole 630 visible in the lower subassembly 620, and part of one alignment hole 630 visible in the edge of the anatomical form 640. The air cavity 650 within the upper subassembly 610 is visible, and the aperture 660 in the lower subassembly 620 is visible. It will also be seen that the aperture 660 for air passage in the anatomical form 640 is much larger than a natural orifice. This larger aperture 660 provides the added benefit of allowing one to test a larger area of the protective mask (not illustrated).

FIG. 7 shows the upper and lower subassemblies 610, 620 in a mated position. The gasket 700 forming the counter form of the upper subassembly 610 is specifically called out in FIG. 7.

FIG. 8 is a plan view of the lower subassembly 620, showing a base plate 800, two alignment holes 630 passing through the anatomical form 640, and one alignment hole 630 in the periphery of the base plate 800 at the bottom of FIG. 8. The gasket 700, formed of sealing material, is added as an overlay in FIG. 8, to show where the gasket 700, which forms the counter form of the upper assembly 610, would mate with the anatomical form 640 when the upper and lower subassemblies 610, 620 are brought together.

In an illustrative example, a prototype test fixture similar to the test fixture 600 shown in FIGS. 6-8 was made by 3D printing. The material for the base plates was Vero™. The material initially chosen for the anatomical form was Agilus 30, because after curing, it has a rubbery consistency that can mimic the consistency of human skin. However, solid printing, i.e., printing at 100% infill of Agilus 30, created an anatomical form that was too firm for the particular set of envisaged tests.

To better model a human face in the context of the tests, an anatomical form of SUP706B was printed encased in a skin of Agilus 30. Specifically, an anatomical form that was useful for the envisaged tests could be made by printing the SUP706B infill at 100% density and encasing it in an outer layer of Agilus 30 that was 4 mm (0.15 inches) thick. For printing the SUP706B infill, the lite option was selected, which is one of the choices for the mesh type that are available with a Polyjet™ printer.

FIG. 9 shows a test fixture 900 in use. As seen in FIG. 9, the test fixture 900 includes upper and lower subassemblies 910, 920 and three alignment pins 930, two of which are visible. An upper base plate 915, of the upper subassembly 910, is shown seated against an upper clamping plate 940 of a filter tester, and a lower base plate 925 of the lower subassembly 920 is shown seated against a lower clamping plate 950 of the filter tester. A protective mask 960 under test is shown clamped between an anatomical form 970 of the lower subassembly 920 and a flow chamber 980 of the upper subassembly 910. Close examination also reveals a gasket 990 forming the counter form portion of the upper subassembly 910.

Figure 10:
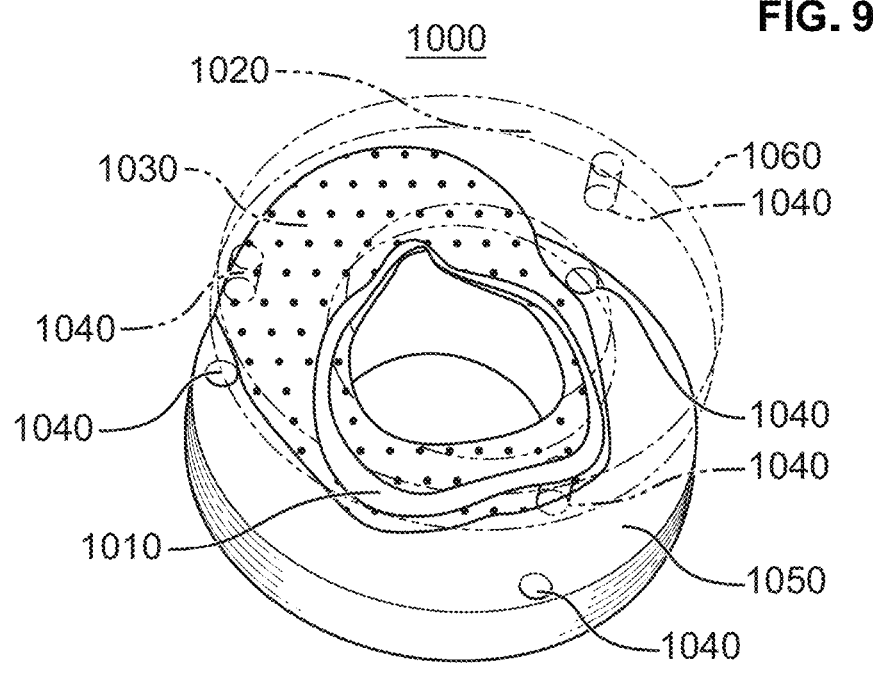
FIGS. 10-12 are images of the lower subassembly of an example design for a test fixture according to an embodiment of the present invention, showing details of a sealing mechanism.
Figure 11:
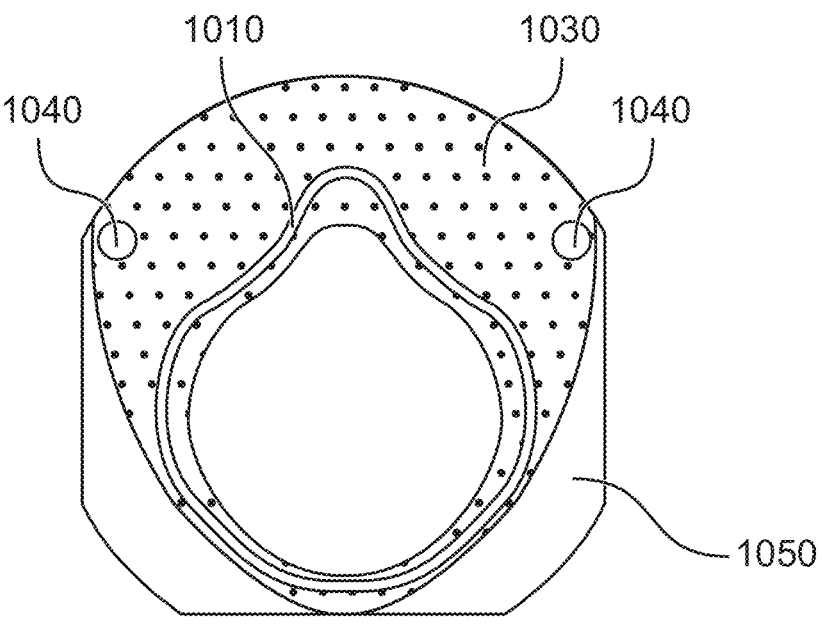
Figure 12:
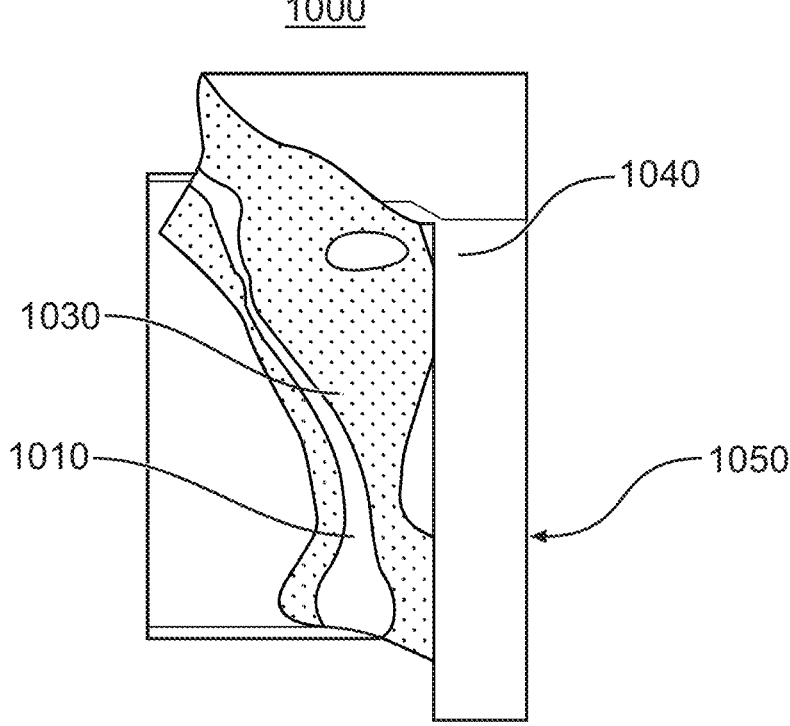

FIGS. 10-12 are three views of an anatomical form 1000 in an example embodiment. These views are presented here to show details of the contact area between the gasket 1010 of an upper assembly 1020 (shown in outline form in FIG. 10) and the mock facial structure 1030 of the anatomical form 1000. This contact area is represented by shading in each of FIGS. 10-12. FIG. 10 also shows alignment holes 1040 in lower base plate 1050, to which the anatomical form 1000 is attached, and in the upper base plate 1060 of the upper assembly 1020. FIG. 10 provides a perspective view, and FIG. 11 provides a plan view. FIG. 12 provides an elevational side view (with the anatomical form 1000 facing to the left instead of upward, as would be typical in use).

With suitable adaptations, a test fixture can be used as a cartridge for transporting a protective mask while it is sealed between the upper and lower subassemblies of the test fixture. If the apertures in the upper and lower base plates are sealed from the air, the test fixture can be made hermetic. This would be useful, for example, in transporting a protective mask between different test stations without exposing it to possible contamination while in transit.

Figure 13:
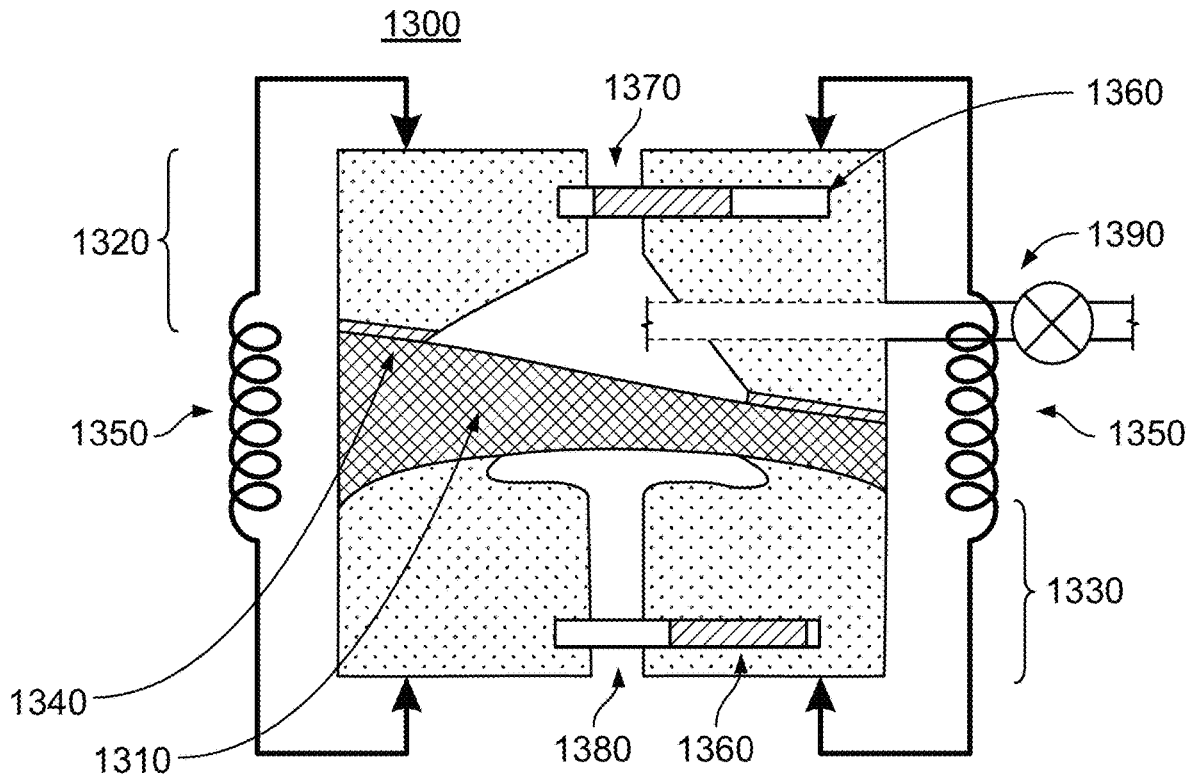
FIG. 13 is a schematic diagram, shown in side-elevational cross section, of a test fixture according to an embodiment of the present invention adapted for transporting a protective mask while maintaining a seal around the protective mask.

FIG. 13 is a notional drawing of a test fixture 1300 modified to serve as a hermetically scalable cartridge. A protective mask 1310 is shown clamped between upper and lower subassemblies 1320, 1330, with a gasket 1340 shown making the seal between the protective mask 1310 and the upper subassembly 1320. A set of spring clips 1350 are symbolically shown as providing the compression that seals the test fixture 1300. Many possible alternative sources of compression are well known in the art, and may be used in practice, including, for example, one or more clamps or one or more screws or bolts. A pair of shutters 1360 is symbolically shown as reversibly sealing off the upper and lower apertures 1370, 1380 in the upper and lower subassemblies 1320, 1330, respectively. Many possible alternative sealing devices are well known in the art, and may be used in practice, including, for example, valves.

Another modification shown symbolically in FIG. 13 is an inlet/outlet 1390 for controlling the environment within the test fixture 1300. For example, the humidity within the test fixture 1300 could be controlled by circulating suitably treated air through such an inlet/outlet 1390. Though not illustrated in FIG. 13, the test fixture 1300 may also include a heater for controlling the temperature of the environment within the test fixture 1300.

It should be noted that although the upper and lower subassemblies in the illustrated examples are completely separable from each other in ordinary use, this is not a requirement. Instead, embodiments are envisaged in which there remains a point of attachment between the two subassemblies, but which permits at least one degree of freedom for opening the lower subassembly to the environment so that a protective mask under test can be inserted or removed. One non-limiting example is provided in FIG. 14. FIG. 14 is a sketch, provided solely for pedagogical purposes, of an arrangement in which there is a rotational degree of freedom about one of the alignment pins 1400. Accordingly, an upper subassembly 1410 can be lifted off of two of the alignment pins 1420 and swiveled about the third alignment pin 1400 to expose the anatomical form of a lower subassembly 1430. Numerous other arrangements, useful for the same essential purpose, will be apparent to those skilled in the art.

It should also be noted that sensors of various kinds can be installed on the upper or lower subassembly so as to be included within the test fixture. For example, sensors may usefully sense humidity, temperature, or pressure. Features may also be included for performing tests of various kinds while the test fixture is hermetically sealed. For example, a nozzle may be included for projecting a liquid contaminant such as synthetic blood at a protective mask while it is clamped within the test fixture, for subsequent examination.

In experimental trials, it was found that useful contours for the anatomical form could be adapted from the ISO Digital Headforms. These are digital headforms that were developed from anthropometric data by the National Personal Protective Technology Laboratory (NPPTL) of NIOSH. (NIOSH is the National Institute for Occupational Safety and Health, a United States Federal Agency and part of the Centers for Disease Prevention and Control within the U.S. Department of Health and Human Services.) The digital headforms represent three-dimensional models, including facial features, of human heads in five distinct sizes. The sizes represented are small, medium, large, long/narrow, and short/wide.

The headforms have been incorporated into a technical specification standard for ISO TC94 Personal Protective Equipment, SC15 Respiratory Protective Devices, WG1 General, PG5 Human Factors. That standard is titled "ISO 16976-2 Respiratory Protective Devices-Human Factors-Part 2: Anthropometrics." The five digital headforms are available in .stl, .ply, and .igs format. Special software such as PolyWorks, Pro Engineering, and AutoCAD are required to open the files. The headforms are accessible online by navigating the NIOSH Data and Statistics Gateway.

In the design studies, contours from the small, medium, and large ISO Digital Headforms were adopted to make fixtures suitable for testing protective masks sized as small, medium, and large, respectively. With suitable adaptation, a fixture could be made in each size that could be used to test commercially available protective masks in the pertinent size from a variety of manufacturers.

A conventional method of protective mask testing requires that a protective mask 1500 be sealed to a floor 1510 of a test fixture 1520 using a putty 1530 or similar sealant, as illustrated in FIG. 15, which may contaminate the protective mask 1500. In contrast, a protective mask can be tested nondestructively by mounting it on an anatomical form that simulates at least that portion of a human face, i.e., a mock human head structure, that contacts the protective mask under conditions of actual use.

Figure 16:
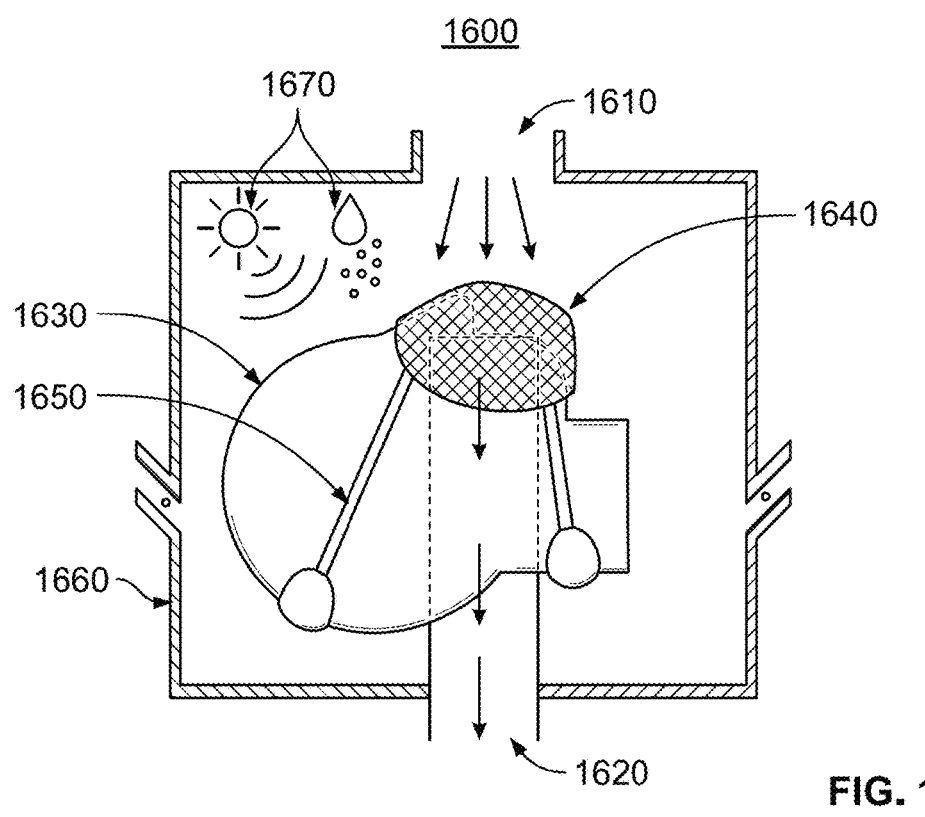
FIG. 16 is a notional view of a test fixture system according to an embodiment of the present invention.

FIG. 16 illustrates a broad concept of an embodiment of the present invention. It should be understood that FIG. 16 is a notional diagram that is presented solely for pedagogical purposes, and not as a realistic representation. As shown in FIG. 16, a test fixture 1600 has an inlet 1610 and an outlet 1620 for airflow. Within the test fixture 1600 is a mock human head structure 1630. The mock human head structure 1630 should include a simulacrum of at least those portions of a human head that contact a protective mask 1640 (with one or more straps 1650 that hold the protective mask 1640 onto the mock human head structure 1630) when it is in use, i.e., the anatomical form 140 of FIG. 1. However, a greater portion of human anatomy, even the entire front portion or more of a human head, may usefully be simulated for some purposes. It should also be understood that even though examples of the anatomical form are referred to as a mock human head structure, those portions that do not directly contact the protective mask do not need to be realistic representations. In fact, unnaturally large apertures may be included to allow for the passage of air via the inlet and outlet 1610, 1620.

Returning to FIG. 16, the protective mask 1640 is shown mounted on the mock human head structure 1630. Instead of the prior art approach of using a sealant 1530 to seal the protective mask 1500 to the mock human head structure, as illustrated in FIG. 15, the protective mask 1640 is pressed against a compliant material that forms a seal to the protective mask 1640 in a similar manner to human skin as illustrated in FIG. 16. The compliant material covers an outer surface portion of the mock human head structure 1630, at least in those areas that contact the protective mask 1640.

Referring again to FIG. 16, it will be seen that the entire mock human head structure 1630 is contained within a scalable box 1660. The flow of air is contained within the scalable box 1660 and permitted to flow from the inlet 1610 of the scalable box 1660 to the outlet 1620 of the scalable box 1660 and fills any space within the scalable box 1660 that is not otherwise occupied. Flow through the mock human head structure 1630 is indicated by arrows which show the path of flow from the inlet 1610 of the scalable box 1660, through the protective mask 1640 being tested, through the mock human head structure 1630, and finally exhausted out of the scalable box 1660 via the outlet 1620. One or more passages, within the mock human head structure 1630, permits the flow of air to be transmitted from the inlet 1610 of the scalable box 1660 to the outlet 1620 of the scalable box 1660. In one embodiment, a single passage is employed, with the single passage encompassing both the nose and mouth portion of the mock human head structure 1630. In other embodiments, these passages may include, for example, a simulated nasal cavity and/or a simulated oral cavity. The simulated nasal cavity permits performance testing of the protective mask 1640 when a user breathes through their nose, while the simulated oral cavity permits performance testing of the protective mask 1640 when a user breathes through their mouth.

Contained within the scalable box 1660 are components 1670 that permit a change of the environment within the scalable box 1660. This could include, but would not be limited to, devices which apply heat to the environment within the scalable box 1660 and/or introduce humidity to the environment within the scalable box 1660. In addition, or in the alternative, these same devices could be contained within the mock human head structure 1630 or apertures therein that would permit the change of environment on either side or both sides of the protective mask 1640 under test. Those skilled in the art will recognize a variety of devices that would alter the environmental conditions within the scalable box 1660 and impact the protective mask 1640 under test.

In certain embodiments, the scalable box 1660 that contains the mock human head structure 1630 is placed between the clamping plates of the conventional filter tester illustrated in FIG. 3 and described above.

Figure 17:
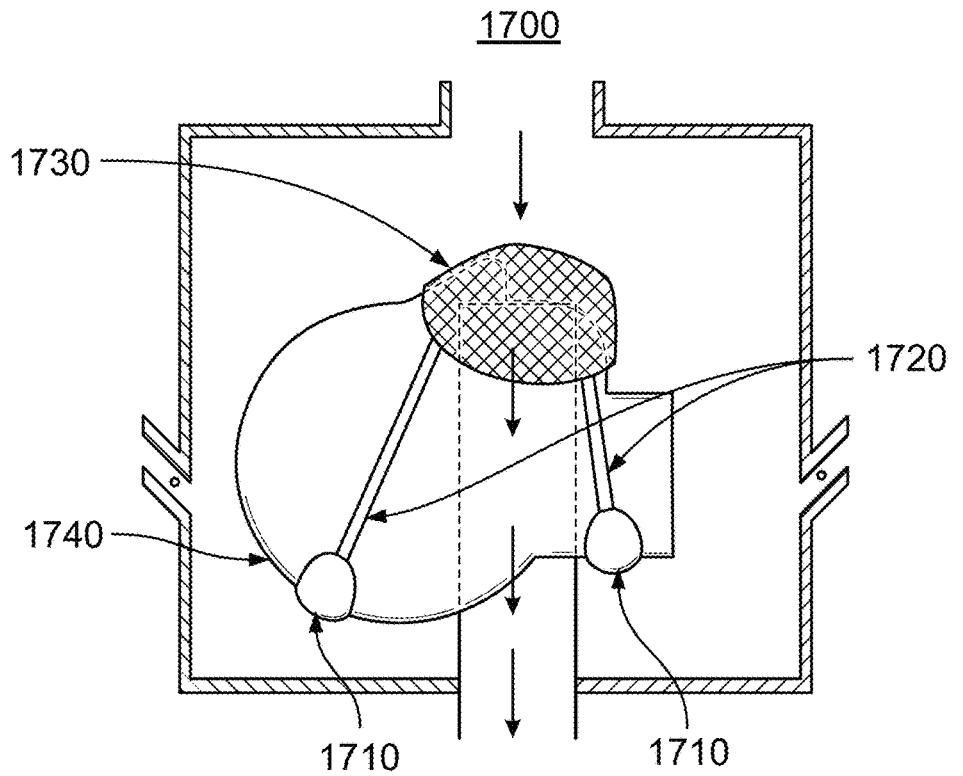
FIG. 17 is a notional view of a test fixture system according to an embodiment of the present invention.

As illustrated in FIG. 17, a test fixture 1700 may employ tensioners 1710 may be used to apply and remove force on one or more straps 1720 that hold a protective mask 1730 onto a mock human head structure 1740. The tensioners 1710 can be placed in locations that permit the required forces for the test to occur. As illustrated in FIG. 17, the straps 1720 used to hold the protective mask 1730 onto the mock human head structure 1740 are placed at the apex of the mock human head structure 1740 and behind the neck. In this example, by using tensioners 1710 in the form of rotating electro-mechanical elements, one could apply and remove forces to the straps 1720. Additionally, by using tensioners 1710 that include bearings and/or materials that permit slip in contact with the straps 1720, undesired wear on the straps 1720 is reduced. In alternative embodiments the tensioners 1710 may employ hydro-mechanical elements in the form of, for example, bladders that may be filled and drained of a fluid or gas.

While the protective mask 1730 illustrated in FIG. 17 has straps 1720 located at the apex of the mock human head structure 1740 and behind the neck, other protective masks employ ear loops that loop over the ears. These ear loop-based protective masks can be tested by including ear structures as part of the mock human head structure 1740. As will be appreciated, testing of these ear loop-based protective masks will generally require tensioners located at different positions than the tensioners 1710 illustrated in FIG. 17.

The force on the straps 1720 applied by the tensioners 1710 can be applied in a variety of ways including, but not limited to, the linear or rotational pulling or pushing against the straps 1720 in various directions or inflatable structures that apply forces to the straps 1720. Those skilled in the art will recognize that various methods and locations by which to apply force to the straps 1720 or the protective mask 1730 may be suitable for inclusion with the test fixture 1700. Further, the test fixture 1700 may, for example, include force sensors (not illustrated) to record the forces applied by the tensioners 1710 on the straps 1720.

Through the variation of forces applied by the tensioners 1710 to the straps 1720 on the protective mask 1730 being tested, the pressures of donning and doffing of the protective mask 1730 may be simulated. Additionally, components of the structure of the protective mask 1730 that include, but are not limited to, welds, stitches, seams, and folds, can be verified for functionality and durability. Further, the materials forming the protective mask 1730 that contact the mock human head structure 1740 can be tested and observed for wear from multiple donning and doffing cycles. These tensioners 1710 thereby enable the test fixture 1700 to perform testing of both the physical and filtering characteristics of the protective mask 1730.

Figure 18A:
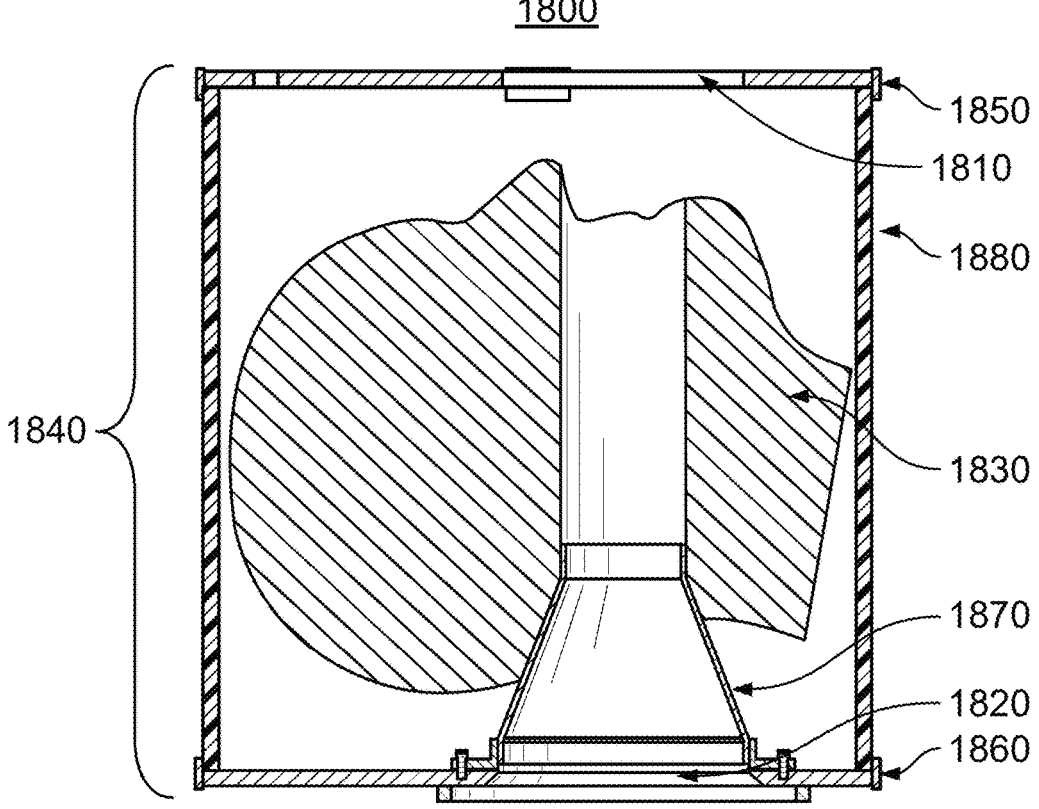
FIGS. 18A-18C are notional views of a test fixture system according to an embodiment of the present invention.
Figure 18B:
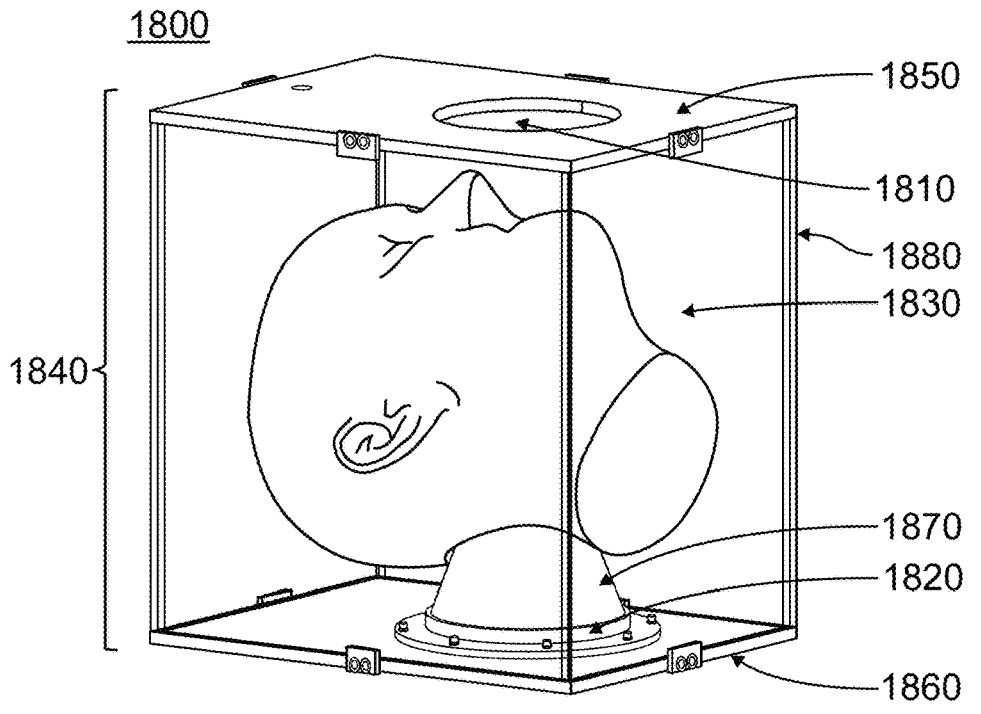
Figure 18C:
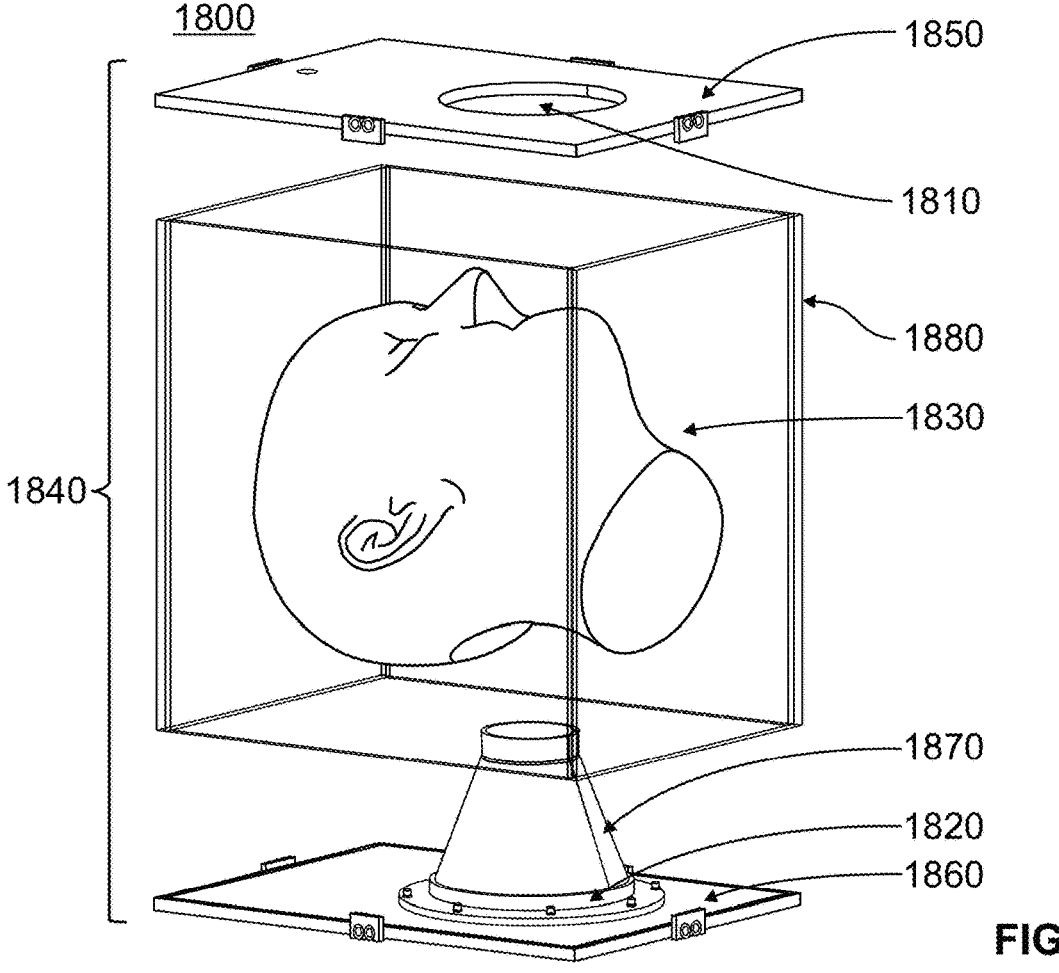

FIGS. 18A-18C illustrate three higher fidelity views of one way to implement a test fixture 1800 in accord with the test fixtures 1600, 1700 described above with respect to FIGS. 16 and 17. As shown in FIG. 18, the test fixture 1800 has an inlet 1810 and an outlet 1820 for airflow. Within the test fixture 1800 is a mock human head structure 1830. The mock human head structure 1830 is housed within a scalable box 1840, formed of a top plate 1850, a bottom plate 1860 having a cone-shaped mount 1870, and a shell 1880. One advantage of the cone-shaped mount 1870, is that it readily permits one to replace one mock human head structure 1830 with another mock human head structure having, for example, different dimensions based upon the five head-forms from the NIOSH Data and Statistics Gateway.

Figure 19A:
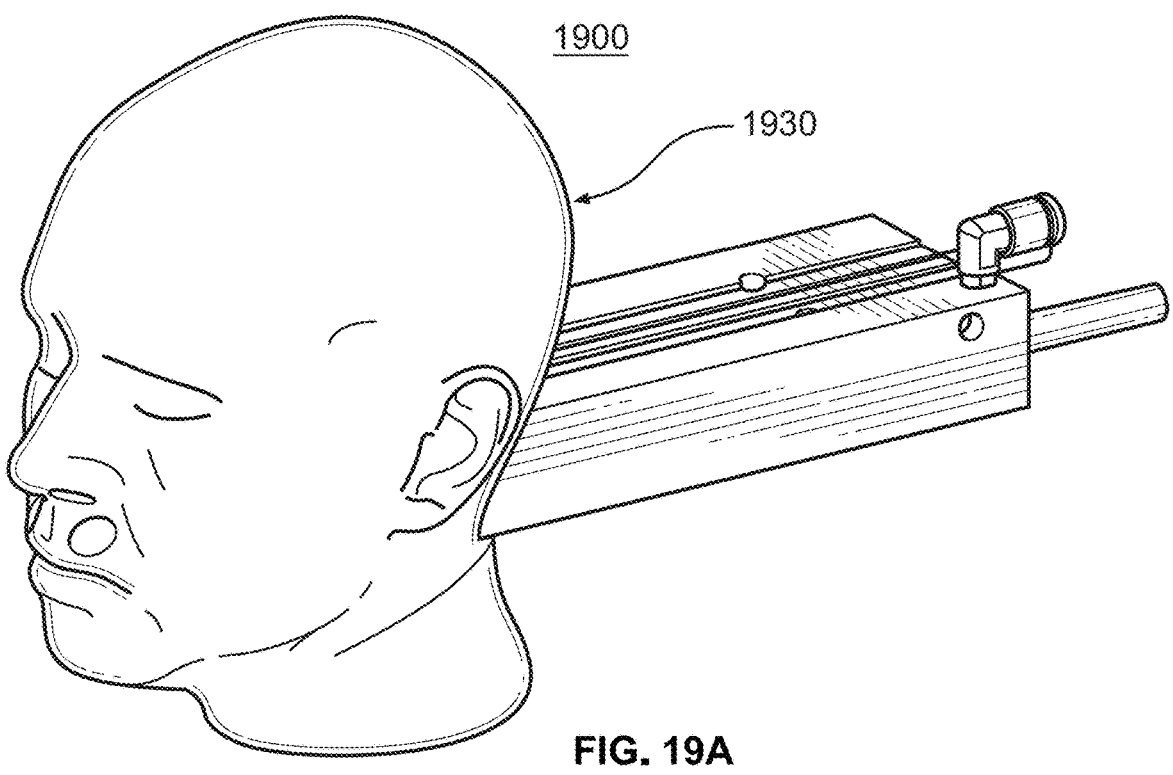
FIGS. 19A-19B are notional views of a test fixture system according to an embodiment of the present invention.
Figure 19B:
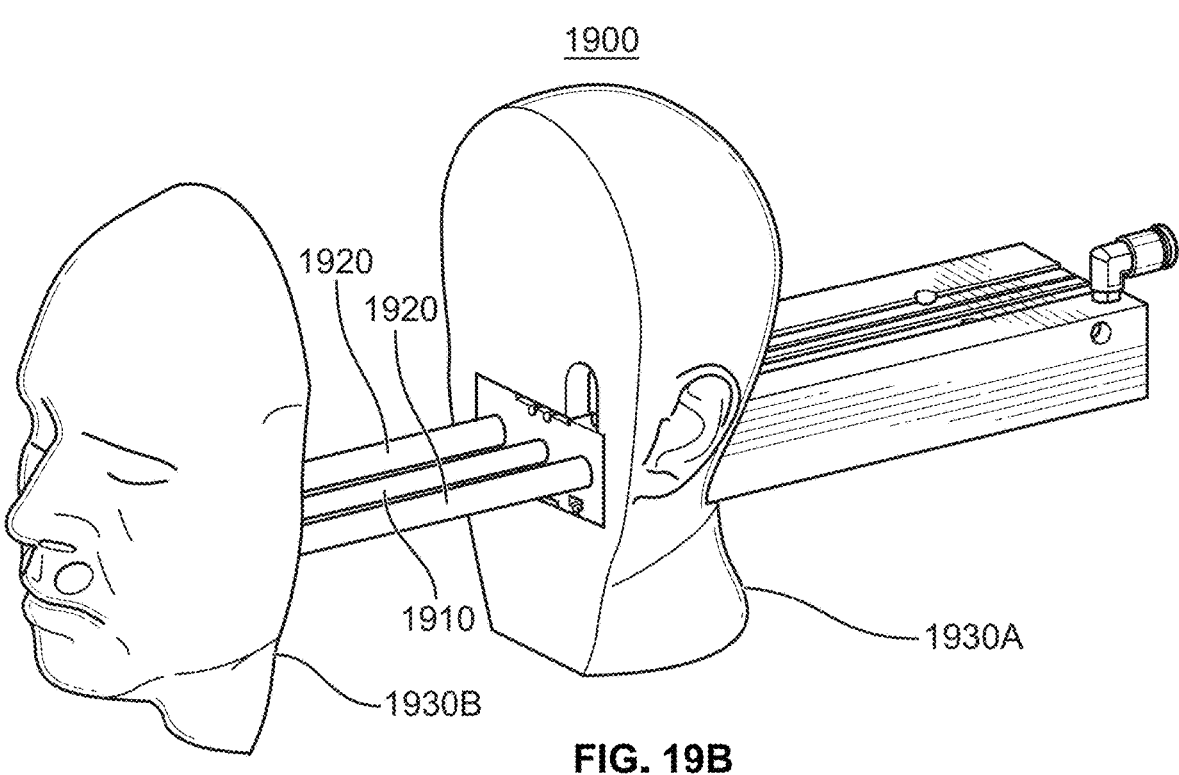

FIGS. 19A and 19B illustrate two views of one way to implement the tensioners described above with respect to FIGS. 16 and 17 for a test fixture 1900. As illustrated in FIG. 19B, a piston 1910 with two guide rods 1920 allow a separable mock human head structure 1930 to be separated into at least two portions 1930A, 1930B. When in the closed state, as illustrated in FIG. 19A, the straps of a protective mask (not illustrated), will be at their operational tension. This allows testing of the protective mask and its sealing capabilities around the periphery of the protective mask, along with testing of the filtering characteristics of the mask. When the piston 1910 is extended, the test fixture 1900 permits testing of the strength of the straps of the protective mask. Specifically, by repeatedly extending and retracting the piston 1910, the durability of the straps themselves, along with the durability of the joints where the straps are fastened to the protective mask, for example, welds or stitches, can be tested. One or more force sensors (not illustrated) can be employed to measure the force applied to the protective mask. The illustrated test fixture 1900 allows for parallel testing of the joints where the straps are fastened to the protective mask, i.e., in a direction parallel to the weld. A similar test fixture with a piston perpendicular to the illustrated piston 1910, which would permit, for example, separation of the cars of the separable mock human head structure 1930, would enable perpendicular testing of the joints where the straps are fastened to the protective mask. Thus, the illustrated test fixture 1900, with its parallel testing, would enable shear testing of the joints where the straps are fastened to the protective mask, while perpendicular testing would enable pull testing of the joints. With appropriate placement of the one or more straps on the protective mask, the test fixture 190 may be used to test protective masks with straps that hook over the cars or straps that pass over the apex of the separable mock human head structure 1930 and behind the neck of the separable mock human head structure 1930. The test fixture 1900 also permits testing of the durability of a nose piece found in many protective masks, and any corresponding attachment mechanisms.

As yet another way of implementing the tensioners described above with respect to FIGS. 16 and 17 for a test fixture, the piston 1910 illustrated in FIG. 19 may be replaced by a screw drive. As will be appreciated, other electro-mechanical or hydro-mechanical elements may be employed to implement the tensioners.

The test fixture 1900 may further be adapted to test the protective mask in a variety of environments. For example, the test fixture 1900 may include a scalable box (not illustrated) and components (not illustrated) that permit a change of the environment within the scalable box. These components could include, but would not be limited to, devices which apply heat to the environment within the scalable box and/or introduce humidity to the environment within the scalable box.

The test fixture 1900 enables repeatable and rapid testing of various physical characteristics of the protective mask without the need for time consuming and variable donning and doffing testing with human testers. As will be appreciated, the test fixture 1900 can perform testing of both the physical and filtering characteristics of the protective mask, though the test fixture 1900 may also be used to test just the physical characteristics of the protective mask if desired.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A test fixture for testing filtering characteristics of a protective mask comprising:
    an anatomical form, the anatomical form emulating contours of at least those portions of a human face that contact a protective mask when a protective mask is in use; and
    a counter form, the counter form including a surface thereof that is a negative of a protective mask or portions of the anatomical form to which the counter form is adapted to mate;
    wherein:
        the anatomical form and the counter form are adapted to be reversibly mateable and are adapted to be clampable in a mated position; and
        within each of the anatomical form and the counter form, respective air passages are defined for airflow through respective forms and, when in use, through a protective mask mounted between the anatomical form and the counter form.

2. The test fixture of claim 1, wherein at least a surface of the anatomical form comprises a compliant material.

3. The test fixture of claim 1, wherein a surface of the counter form includes a gasket, the gasket comprising a compliant material.

4. The test fixture of claim 1, wherein:
    one of the anatomical form or the counter form includes a plurality of alignment pins; and
    another one of the anatomical form or the counter form includes a plurality of alignment holes, each of the plurality of alignment holes adapted to align with a corresponding one of the plurality of alignment pins.

5. The test fixture of claim 1 further comprising means for compressing adapted to compress the anatomical form against the counter form, the means for compressing including at least one of a spring clip, a clamp, a screw, or a bolt.

6. The test fixture of claim 5 further comprising a pair of means for sealing adapted to seal the air passages within the anatomical form and the counter form, each of the pair of means for sealing including a shutter or a valve.

7. The test fixture of claim 5 further comprising at least one of an inlet or an outlet, each of the at least one inlet or outlet adapted to control an environment within the test fixture.

8. The test fixture of claim 1, wherein one of:
    the air passage in the anatomical form includes both a simulated nasal cavity and a simulated oral cavity, thereby permitting testing of a flow of air through a protective mask, the simulated nasal cavity, and the simulated oral cavity;
    the air passage in the anatomical form includes a simulated nasal cavity, thereby permitting testing of a flow of air through a protective mask and the simulated nasal cavity; or
    the air passage in the anatomical form includes a simulated oral cavity, thereby permitting testing of a flow of air through a protective mask and the simulated oral cavity.

9. The test fixture of claim 1, wherein at least one of the anatomical form or the counter form includes a heater, the heater adapted to heat the protective mask.

\* \* \* \* \*